United States Patent [19]
Horiuchi et al.

[11] Patent Number: 5,610,117
[45] Date of Patent: Mar. 11, 1997

[54] CATALYST FOR PURIFICATION OF DIESEL ENGINE EXHAUST GAS

[75] Inventors: Makoto Horiuchi; Masahito Kida, both of Hyogo, Japan

[73] Assignee: ICT Co., Ltd., Osaka-fu, Japan

[21] Appl. No.: 392,381

[22] Filed: Feb. 22, 1995

[51] Int. Cl.$^6$ ...................................................... B01J 23/32
[52] U.S. Cl. ........................................ 502/324; 423/213.5
[58] Field of Search ........................... 502/324; 423/213.5

[56] References Cited

U.S. PATENT DOCUMENTS

| | | | |
|---|---|---|---|
| 3,493,325 | 2/1970 | Roth | 502/324 |
| 3,881,696 | 5/1975 | Lepeytre et al. | 252/466 |
| 3,898,183 | 8/1975 | Sugier et al. | 502/324 |
| 3,957,691 | 5/1976 | Adachi et al. | 252/466 |
| 4,299,734 | 11/1981 | Fujitani et al. | 252/462 |
| 4,492,770 | 1/1985 | Blanchard et al. | 502/324 |
| 4,639,432 | 1/1987 | Holt et al. | 502/324 |
| 4,749,671 | 6/1988 | Saito et al. | 502/324 |
| 5,106,802 | 4/1992 | Horiuchi et al. | 502/324 |

FOREIGN PATENT DOCUMENTS

| | | |
|---|---|---|
| 0027069 | 9/1980 | European Pat. Off. |
| 0092023 | 10/1983 | European Pat. Off. |
| 0449423 | 2/1991 | European Pat. Off. |
| 3729126 | 4/1989 | Germany |
| 61-129030 | 6/1986 | Japan |
| 61-146314 | 7/1986 | Japan |
| 61-149222 | 7/1986 | Japan |

OTHER PUBLICATIONS

Drewent Publications—Purification Catalyst Exhaust Gas, etc.
European Search Report, EP 95 10 2208, Jul. 12, 1995.
Paper 810263.

*Primary Examiner*—Thurman K. Page
*Assistant Examiner*—Kathryne E. Shelborne
*Attorney, Agent, or Firm*—Omri M. Behr, Esq.

[57] ABSTRACT

A catalyst for purification of diesel engine exhaust gas is disclosed which comprises having (A) a catalytic component comprising the two elements of iron and manganese and a refractory inorganic oxide and optionally an alkaline earth element and/or a rare earth element and (B) a catalytic component comprising at least one noble metal selected from the group consisting of palladium, platinum, and rhodium and a refractory inorganic oxide and optionally copper deposited in the form of a single layer on a refractory three-dimensional structure. This catalyst is capable of removing such harmful components as carbonaceous particulates, unburned hydrocarbons, and carbon monoxide from the diesel engine exhaust gas and, moreover, suppress the formation of sulfates from sulfur dioxide.

25 Claims, No Drawings

CATALYST FOR PURIFICATION OF DIESEL ENGINE EXHAUST GAS

BACKGROUND OF THE INVENTION

1. Field of the Invention

This invention relates to a catalyst for purification of diesel engine exhaust gas. More particularly, it relates to a catalyst which can purify the diesel engine exhaust gas of such harmful components as carbonaceous particulates, unburned hydrocarbons, and carbon monoxide by combustion from a low temperature upward and moreover suppress the formation of sulfate from sulfur dioxide.

2. Description of the Prior Art

In recent years, the microfine substances (mainly comprising solid carbonaceous particulates, sulfur type particulates such as of sulfates, and liquid or solid polymeric hydrocarbon particulates; hereinafter referred to collectively as "microfine substances") particularly in the diesel engine exhaust gas have been posing a problem from the viewpoint of environmental hygiene. The reason for this problem is that virtually all these microfine substances have diameters of not more than 1 μm and, therefore, are liable to be suspended in the open air and taken into human bodies by respiration. Thus, studies are now under way in the direction of increasingly exacting the regulations concerning the discharge of such microfine substances from diesel engines.

Meanwhile, the amounts of microfine substances discharged from diesel engines have been decreased to some extent in consequence of such improvements as increased pressures for the injection of fuel into the diesel engines and enhanced control of the timing of fuel injection. These decreases of amount are still short of being fully satisfactory. Soluble organic fraction (SOF) which are contained in the microfine substances are formed mainly of liquid polymeric hydrocarbons. And they cannot be removed by such improvements in the diesel engine as mentioned above. As a result, the ratio of the SOF to the whole microfine substances has increased. Since the SOF contain such harmful components as cancerogenic substances, the removal of the SOF has become as important a problem as that of the microfine substances.

As a means for removing the microfine substances from diesel engine exhaust gas, the feasibility of the catalytic method which effects the removal of the carbonaceous particulates by seizing the microfine substances suspended in the diesel engine exhaust gas by the use of a catalyst obtained by depositing a catalytic substance capable of burning carbonaceous particulates on such a refractory three-dimensional structure as, for example, a ceramic foam, a wire mesh, a metallic foam, a pore-sealed type ceramic honeycomb, an open flow type ceramic honeycomb, or a metallic honeycomb and under the conditions of gas discharge (as to the composition and the temperature of gas) obtainable under the normal travelling conditions of a diesel engine or by the use of an electric heater or other similar heating means is now under study.

Generally, the catalyst for the purification of the diesel engine exhaust gas is desired to possess the qualities of (A) permitting highly efficient removal of harmful components including unburned hydrocarbons and carbon monoxide in addition to carbonaceous particulates from a low temperature upward, (B) avoiding obvious oxidation of sulfur dioxide ($SO_2$) arising from sulfur components copiously contained in gas oil as the fuel into sulfur trioxide ($SO_3$) and suppressing the formation of sulfates (such products of oxidation of sulfur dioxide as sulfur trioxide and sulfur mist), and (C) tolerating continuous service under high load, namely manifesting the so-called high durability to resist high temperature.

JP-A-61-129,030, JP-61-149,222, and JP-61-146,314, for example, disclose a catalytic composition having palladium and rhodium as main active components and additionally incorporating alkali metals, alkaline earth metals, copper, lanthanum, zinc, manganese, etc. EP-A-0092023 discloses a catalytic composition combining at least one member selected from the group consisting of copper, alkali metals, molybdenum, and vanadium with at least one member selected from the group consisting of platinum, rhodium, and palladium.

Further, a noble metal oxide catalyst of the shape of an open honeycomb furnished with through holes parallel to the flow of gas for use in the removal of SOF in the diesel engine exhaust gas has been reported (SAE Paper, 810263).

The conventional catalysts mentioned above are invariably effective to a certain extent in removing carbonaceous particulates by combustion or removing SOF. Of these conventional catalysts, those which contain platinum group metals manifest a great ability to oxidize sulfur dioxide under the conditions of discharge of gas at high temperatures and form sulfates in a notably large amount and, therefore, are at a disadvantage in entailing an environmental problem anew because of these sulfates.

A catalyst which is fully endowed with the aforementioned qualities of (A) to (C) required for the catalytic purification of the diesel engine exhaust gas and further vested with an ample ability to remove SOF has not yet been developed.

An object of this invention is to provide a catalyst for purification of diesel engine exhaust gas which permits highly efficient removal of microfine substances in the diesel engine exhaust gas.

A further object of this invention is to provide a catalyst for purification of diesel engine exhaust gas which possesses an ability to remove such harmful components as unburned hydrocarbons and carbon monoxide in addition to carbonaceous particulates in the diesel engine exhaust gas by combustion from a low temperature upward and, moreover, avoids obvious oxidation of sulfur dioxide and suppresses the formation of sulfates.

Another object of this invention is to provide a catalyst for purification of diesel engine exhaust gas which permits highly efficient removal of SOF in the diesel engine exhaust gas.

Yet another object of this invention is to provide a catalyst for purification of diesel engine exhaust gas which manifests an ideal ability to resist high temperatures and operates effectively as mounted on a diesel car without entailing any practical problem.

SUMMARY OF THE INVENTION

The objects mentioned above are accomplished by a catalyst for purificaiton of diesel engine exhaust gas, which comprises having (A) a first catalytic component comprising the two elements of iron and manganese and a refractory inorganic oxide and (B) a third catalytic component comprising at least one noble metal selected from the group consisting of palladium, platinum, and rhodium and a refractory inorganic oxide deposited in the form of a single layer on a refractory three-dimensional structure.

This invention further concerns the catalyst mentioned above, wherein a total amount of the two elements of iron and manganese deposited is in the range of from 0.5 to 50 g and an amount of the noble metal in the range of from 0.001 to 6 g per liter of the three-dimensional structure and a molar ratio of iron to manganese is in the range of from 10:1 to 1:10.

This invention further concerns the catalyst mentioned above, wherein a total amount of the refractory inorganic oxide is in the range of from 1 to 300 g per liter of the catalyst.

This invention further concerns the catalyst mentioned above, wherein the refractory inorganic oxide has an average particle diameter in the range of from 0.1 to 5 vm and a BET surface area in the range of from 1 to 200 $m^2/g$.

This invention further concerns the catalyst mentioned above, wherein a total amount of iron and manganese is in the range of from 0.1 to 98% by weight and an amount of the noble metal in the range of from 0.0003 to 80% by weight, based on an amount of the refractory inorganic oxide.

This invention further concerns the catalyst mentioned above, wherein the three-dimensional structure is an open flow type ceramic honeycomb or metal honeycomb carrier.

The objects mentioned above are also accomplished by a catalyst for purification of diesel engine exhaust gas, which comprises having (A) a second catalytic component comprising the two elements of iron and manganese, a refractory inorganic oxide, and an alkaline earth element and/or a rare earth element and (B) a third catalytic component comprising at least one noble metal selected from the group consisting of palladium, platinum, and rhodium and a refractory inorganic oxide deposited in the form of a single layer on a refractory three-dimensional structure.

This invention further concerns the catalyst mentioned above, wherein a total amount of the two elements of iron and manganese deposited is in the range of from 0.5 to 50 g, an amount of the alkaline earth element in the range of from 0 to 20 g, and an amount of the rare earth element in the range of from 0 to 30 g per liter of the three-dimensional structure, wherein a total amount of the alkaline earth element and the rare earth element is beyond 0g, and a molar ratio of iron to manganese is in the range of from 10:1 to 1:10.

This invention further concerns the catalyst mentioned above, wherein a total amount of the refractory inorganic oxide is in the range of from 1 to 300 g per liter of the catalyst.

This invention further concerns the catalyst mentioned above, wherein the refractory inorganic oxide has an average particle diameter in the range of from 0.1 to 5 μm and a BET surface area in the range of from 1 to 200 $m^2/g$.

This invention further concerns the catalyst mentioned above, wherein a total amount of iron and manganese is in the range of from 0.1 to 98% by weight and an amount of the noble metal in the range of from 0.0003 to 80% by weight, based on the amount of the refractory inorganic oxide.

This invention further concerns the catalyst mentioned above, wherein the three-dimensional structure is an open flow type ceramic honeycomb or metal honeycomb carrier.

This invention further concerns the catalyst mentioned above, wherein an amount of the alkaline earth element per liter of the three-dimensional structure carried is in the range of from 0.1 to 10 g and the amount of the rare earth element per liter of the three-dimensional structure is in the range of from 0.1 to 10 g.

The objects mentioned above are further accomplished by a catalyst for purification of diesel engine exhaust gas, which comprises having (A) a first catalytic component comprising the two elements of iron and manganese and a refractory inorganic oxide and (B) a fourth catalytic component comprising at least one noble metal selected from the group consisting of palladium, platinum, rhodium, and copper, and a refractory inorganic oxide deposited in the form of a single layer on a refractory three-dimensional structure.

This invention further concerns the catalyst mentioned above, wherein a total amount of the two elements of iron and manganese deposited is in the range of from 0.5 to 50 g, an amount of the noble metal in the range of from 0.001 to 6 g, and an amount of copper in the range of from 0.01 to 10 g and the molar ratio of iron to manganese is in the range of from 10:1 to 1:10.

This invention further concerns the catalyst mentioned above, wherein the amount of the refractory inorganic oxide is in the range of from 1 to 300 g per liter of the catalyst.

This invention further concerns the catalyst mentioned above, wherein the refractory inorganic oxide has an average particle diameter in the range of from 0.1 to 5 μm and a BET surface area in the range of from 1 to 200 $m^2/g$.

This invention further concerns the catalyst mentioned above, wherein a total amount of iron and manganese is in the range of from 0.1 to 98% by weight and an amount of the noble metal in the range of from 0.0003 to 80% by weight, based on the amount of the refractory inorganic oxide.

This invention further concerns the catalyst mentioned above, wherein the three-dimensional structure is an open flow type ceramic honeycomb or metal honeycomb carrier.

This invention further concerns the catalyst mentioned above, wherein an amount of copper per liter of the three-dimensional structure is in the range of from 0.1 to 3 g.

The objects mentioned above are further accomplished by a catalyst for purification of diesel engine exhaust gas, which comprises having (A) a second catalytic component comprising the two elements of iron and manganese, a refractory inorganic oxide, and an alkaline earth element and/or a rare earth element and (B) a fourth catalytic component comprising at least one noble metal selected from the group consisting of palladium, platinum, rhodium, and copper, and a refractory inorganic oxide deposited in the form of a single layer on a refractory three-dimensional structure.

This invention further concerns the catalyst mentioned above, wherein a total amount of the two elements of iron and manganese deposited is in the range of from 0.5 to 50 g, an amount of the alkaline earth element in the range of from 0 to 20 g, an amount of the rare earth element in the range of from 0 to 30 g, wherein a total amount of the alkaline earth element and the rare earth element is beyond 0 g, an amount of the noble metal is in the range of 0.001 to 6 g and an amount of copper is in the range of 0.01 to 10 g per liter of the three-dimensional structure and the molar ratio of iron to manganese is in the range of from 10:1 to 1:10.

This invention further concerns the catalyst mentioned above, wherein a total amount of the refractory inorganic oxide is in the range of from 1 to 300 g per liter of the catalyst.

This invention further concerns the catalyst mentioned above, wherein the refractory inorganic oxide has an average particle diameter in the range of from 0.1 to 5 µm and a BET surface area in the range of from 1 to 200 m²/g.

This invention further concerns the catalyst mentioned above, wherein a total amount of iron and manganese is in the range of from 0.1 to 98% by weight and an amount of the noble metal in the range of from 0.0003 to 80% by weight, based on the amount of the refractory inorganic oxide.

This invention further concerns the catalyst mentioned above, wherein the three-dimensional structure is an open flow type ceramic honeycomb or metal honeycomb carrier.

This invention further concerns the catalyst mentioned above, wherein an amount of the alkaline earth element per liter of the three-dimensional structure is in the range of from 0.1 to 10 g and an amount of the rare earth element per liter of the three-dimensional structure in the range of from 0.1 to 10 g.

This invention further concerns the catalyst mentioned above, wherein an amount of copper per liter of the three-dimensional structure is in the range of 0.1 to 3 g.

The catalyst of this invention excels in ability to remove such harmful components as unburned hydrocarbons and carbon monoxide in addition to carbonaceous particulates and, because of deficiency in ability to oxidize sulfur dioxide in a high temperature range, permits suppression of the formation of sulfates. The catalyst of this invention, therefore, functions excellently in decreasing the amount of microfine substances in the diesel engine exhaust gas. By the use of the catalyst of this invention, the diesel engine exhaust gas can be purified with high efficiency.

Further, since the catalyst of this invention excels in ability to remove SOF, the purification of the diesel engine exhaust gas is attained with extremely high effectiveness.

Since the catalyst of this invention further excels in durability to resist high temperatures, it can be operated effectively as mounted on a diesel car without entailing any practical problem.

The catalyst of this invention, therefore, possesses an ability to purify diesel engine exhaust gas by removing SOF and unburned hydrocarbons from a low temperature onward and manifests an excellent quality of suppressing the ratio of oxidation of sulfur dioxide to below 4% even at elevated temperatures up to 500° C.

As described above, the catalyst of this invention is highly useful as a purifying catalyst for diesel engine exhaust gas.

EXPLANATION OF THE PREFERRED EMBODIMENT

Now, this invention will be explained more specifically hereinbelow.

The refractory inorganic oxides which are effectively used in this invention include activated alumina, silica, titania, zirconia, silica-alumina, alumina-zirconia, alumina-titania, silica-titania, silica-zirconia, titania-zirconia, and zeolites, for example. The refractory inorganic oxides have an average particle diameter in the range of from 0.1 to 5 µm, preferably from 0.5 to 2 µm. The BET (Brunaer-Emmett-Teller) surface area of the refractory inorganic oxides is in the range of from 1 to 200 m²/g, preferably from 10 to 150 m²/g.

The total amount of the two elements of iron and manganese per liter of the three-dimensional structure to be carried is in the range of from 0.5 to 60 g, preferably from 2 to 20 g, per liter of the three-dimensional structure. If the amount per liter of the three-dimensional structure is less than 0.5 g, the two elements will be deficient in activity. Conversely, if this amount exceeds 50 g, the excess will not bring about a proportionate increase in the activity. The molar ratio of iron to manganese (Fe:Mn) is in the range of from 10:1 to 1:10, more preferably from 4:1 to 1:4, and most preferably 3:2.

The starting materials for iron and manganese are not particularly restricted but may be selected from among those which are popularly used in the technical field pertinent hereto. As concrete examples of such materials, metals, oxides, carbonates, nitrates, hydroxides, hydrochlorides, and acetates may be cited.

In the first catalytic component, the total amount of the two elements of iron and manganese is in the range of from 0.1 to 98% by weight, preferably from 2 to 60% by weight, based on the amount of the refractory inorganic oxide mentioned above.

This first catalytic component may additionally incorporate therein an alkaline earth element or a rare earth element to form the second catalytic component. The term "alkaline earth element" as used herein refers to all the elements that belong to the alkaline earth group and the term "rare earth element" to all the elements that belong to the lanthanoide series. The amount of the alkaline earth element to be carried is in the range of from 0 to 20 g, preferably from 0.1 to 10 g, per liter of the refractory three-dimensional structure. If the amount of the alkaline earth element exceeds 20 g, the excess will bring about no proportionate increase in activity.

The amount of the rare earth element is from 0 to 30 g, preferably from 0.1 to 10 g, per liter of the refractory three-dimensional structure. If the amount of the rare earth element exceeds 30 g, the excess will bring about no proportionate increase in activity.

The starting materials for the alkaline earth element and the rare earth element are not particularly restricted but may be selected from among those which are popularly used in the technical field pertinent hereto. As concrete examples of such materials, metals, oxides, carbonates, nitrates, sulfates, hydroxides, hydrogenides, and acetates may be cited.

The amount to be carried of at least one noble metal selected from the group consisting of palladium, platinum, and rhodium is in the range of from 0.001 to 6 g, preferably from 0.05 to 3 g, per liter of the three-dimensional structure. If this amount is less than 0.001 g, the catalyst will be deficient in activity. Conversely, if the amount exceeds 6 g, the excess will bring about no proportionate increase in the activity.

As typical examples of the starting materials for the noble metal, metals, nitrates, and hydrochlorides may be cited. The amount of the noble metal is in the range of from 0.0003 to 80% by weight, preferably from 0.04 to 20% by weight, based on the amount of the refractory inorganic oxide. The incorporation of the noble metal results in the formation of the third catalytic component.

When the third catalytic component further incorporates copper therein, it forms the fourth catalytic component. The amount of copper is in the range of from 0.01 to 10 g, preferably from 0.1 to 3 g, per liter of the refractory three-dimensional structure. If the amount of copper exceeds 10 g, the amount of sulfates to be formed at elevated temperatures exceeding 500° C. will be unduly large. Hence, the upper limit of 10 g.

The starting materials for copper are not particularly restricted but may be selected from among those which are popularly used in the technical field pertinent hereto. As typical examples of such materials, metals, oxides, carbonates, nitrates, sulfates, hydroxides, hydrogenides, and acetates may be cited.

The total amount of the refractory inorganic oxides is in the range of from 1 to 300 g, preferably 10 to 100 g, per liter of the catalyst. If this amount is less than 1 g, the contribution of the refractory inorganic oxide to the activity of the catalyst will be unduly small. Conversely, if the amount exceeds 300 g, the excess will bring about no proportionate increase in activity and the catalyst to be used in the form of a refractory three-dimensional structure will tend to incur an increased back pressure.

The elements described above may be used herein as deposited on a refractory inorganic oxide or as mixed with the refractory inorganic oxide.

The catalyst of this invention is so constructed that a catalytic component having the two elements of iron and manganese and optionally an alkaline earth element and/or a rare earth element deposited as dispersed on a refractory inorganic oxide and a catalytic component having at least one noble metal selected from among palladium, platinum, and rhodium and optionally elemental copper deposited as dispersed on a refractory inorganic oxide may be deposited in the form of a single layer on a refractory three-dimensional structure.

The refractory three-dimensional structure to be used in this invention may be any of the well-known monolithic carriers such as, for example, ceramic foam, open flow ceramic honeycomb, wall flow type honeycomb monolith, open flow metal honeycomb, metal foam, and metal mesh. The open flow type ceramic honeycomb or the metal honeycomb is ideally used among other monolithic carriers mentioned above particularly when a given diesel engine exhaust gas contain not more than 100 mg of microfine substances per $m^3$ and the microfine substances have a SOF content of not less than 20%.

The materials which are particularly preferably usable for the ceramic honeycomb carrier include cordierite, mullite, α-alumina, zirconia, titania, titanium phosphate, aluminum titanate, petalite, spondumene, aluminosilicate, and magnesium silicate, for example. The ceramic honeycomb carrier which is made of cordierite proves to be particularly desirable among other materials cited above. The metal honeycomb carrier which is obtained in a one-piece structure with such a metal as stainless steel or a Fe-Cr-Al alloy which is meagerly resistant to oxidation and highly resistant to heat is advantageously used. The term "element" found in the present specification is used as defined in a sense so broad as to embrace a metal and an oxide.

The method for preparing the catalyst of this invention is not particularly restricted. This catalyst may be prepared, for example, by the following method.

A refractory inorganic oxide is placed in and impregnated with an aqueous solution containing compounds respectively of iron and manganese and optionally a compound of an alkaline earth element and/or a rare earth element in prescribed amounts. The prepared wet catalyst was dried at a temperature in the range of from 80° to 250° C., preferably 100° to 150° C. and then calcined at a temperature in the range of from 300° to 850° C., preferably from 400° to 600° C., to afford a powder having the oxides of the relevant metals deposited as dispersed on the refractory inorganic oxide. Separately, a powder is obtained by following the procedure described above while impregnating a refractory inorganic oxide with an aqueous solution containing at least one noble metal selected from the group consisting of palladium, platinum, and rhodium and optionally a compound of copper in prescribed amounts.

A catalyst aimed at is obtained by wet pulverizing these powders until formation of a slurry, impregnating a refractory three-dimensional structure with the slurry, draining excess slurry from the prepared wet catalyst, then drying the prepared wet catalyst at a temperature in the range of from 80° to 250° C., preferably from 100° to 150° C., and calcining the dried catalyst at a temperature in the range of from 300° to 850° C., preferably from 400° to 600° C.

Now, this invention will be explained more specifically below with reference working examples.

EXAMPLE 1

In an aqueous solution prepared by dissolving 1012 g of iron nitrate and 406 g of manganese acetate in deionized water, 1 kg of zirconia powder (average particle diameter 2.0 µm) having a specific surface area of 56 $m^2/g$ was placed and thoroughly stirred. The prepared wet mixture was dried at 150° C. for 1 hour and then calcined at 500° C. for 1 hour to obtain a zirconia powder (average particle diameter 1.5 µm) having iron oxide ($Fe_2O_3$) and manganese oxide ($MnO_2$) deposited as dispersed thereon. Another zirconia powder (average particle diameter 1.5 µm) was obtained by following the procedure described above while using an aqueous solution having palladium nitrate containing 80 g of palladium and 155 g of copper nitrate dissolved in deionized water instead. These zirconia powders were mixed and wet pulverized until formation of a slurry.

A cylindrical honeycomb carrier of cordierite measuring 5.66 inches in diameter and 6.00 inches in length and containing about 400 open flow gas cells having a cross-sectional area of 1 square inch was immersed in the slurry obtained as described above. The wet honeycomb carrier was made to drain off excess slurry, then dried at 150° C. for 2 hours, and subsequently calcined at 500° C. for 1 hour, to obtain a catalyst.

The amounts of iron oxide, manganese oxide, palladium, and copper oxide deposited on the catalyst were found to be 5 g, 3.6 g, 2 g, and 1 g respectively per liter of the structure and the amount of zirconia was found to be 25 g respectively per liter of the structure.

EXAMPLE 2

In a deionized water, 1.2 kg of alumina powder (average particle diameter 1.0 µm) having a specific surface area of 118 $m^2/g$, 120 g of iron oxide, and 40 g of manganese oxide were placed and thoroughly stirred. The prepared wet mixture was dried at 200° C. for 1 hour and further calcined at 600° C. for 2 hours, to obtain an alumina powder. Separately, 800 kg of zirconia powder (average particle diameter 1.2 µm) having a specific surface area of 80 $m^2/g$ was placed and thoroughly stirred in an aqueous solution prepared by dissolving palladium nitrate containing 240 g of palladium in deionized water. The prepared wet catalyst was dried at 150° C. for 1 hour and further calcined at 700° C. for 1 hour to obtain a zirconia powder having palladium deposited as dispersed thereon. The alumina powder and the zirconia powder were thoroughly mixed and wet pulverized until formation of a slurry.

The same honeycomb carrier of cordierite as used in Example 1 was immersed in the slurry obtained as described above. The resultant was made to drain off excess slurry, dried at 150° C. for 1 hour, and then calcined at 700° C. for 1 hour, to obtain a catalyst.

9

The amounts of iron oxide, manganese oxide, palladium, alumina, and zirconia deposited on the catalyst were found to be 3 g, 1 g, 6 g, 30 g, and 20 g respectively per liter of the structure.

EXAMPLE 3

In an aqueous solution prepared by dissolving 167 g of ferric sulfate and 325 g of manganese nitrate in deionized water, 1 kg of a silica powder (average particle diameter 1.2 μm) having a specific surface area was placed and thoroughly stirred. The prepared wet mixture was dried at 150° C. for 1 hour and further calcined at 550° C. for 2 hours to obtain a silica powder having iron oxide and manganese oxide deposited as dispersed thereon. A titania powder was obtained by following the procedure described above while causing impregnation of 1 kg of a titania powder (average particle diameter 1.2 μm) having a specific surface area of 100 m$^2$/g in an aqueous solution prepared by dissolving rhodium nitrate containing 20 g of rhodium in deionized water. The silica powder and the titania powder were thoroughly mixed and wet pulverized until formation of a slurry.

A cylindrical honeycomb carrier of stainless steel measuring 5.66 inches in diameter and 6.00 inches in length and containing about 300 open flow gas cells having a cross-sectional area of 1 square inch was immersed in the slurry obtained as described above. The wet honeycomb carrier was made to drain off excess slurry, then dried at 150° C. for 1 hour, and subsequently calcined at 400° C. for 1 hour, to obtain a catalyst.

The amounts of iron oxide, manganese oxide, rhodium, silica, and titania carried on the catalyst were found to be 2 g, 3 g, 1 g, 50 g, and 50 g respectively per liter of the structure.

EXAMPLE 4

In an aqueous solution prepared by dissolving 506 g of iron nitrate and 1083 g of manganese nitrate in deionized water, 1 kg of titania-zirconia powder (average particle diameter 1.0 μm, $TiO_2/ZrO_2$ molar ratio 3/1) having a specific surface area of 146 m$^2$/g was placed and thoroughly stirred. The prepared wet mixture was dried at 150° C. for 2 hours and further calcined at 600° C. for 1 hour to obtain a titania-zirconia powder having iron oxide and manganese oxide deposited as dispersed thereon. A silica-alumina powder was obtained by following the procedure described above while causing impregnation of 700 g of silica-alumina powder ($SiO_2/Al_2O_3$ molar ratio 2/1) having a specific surface area of 116 m$^2$/g in an aqueous solution prepared by dissolving chloroplatinic acid containing 20 g of platinum in deionized water. The titania-zirconia powder and the silica-alumina powder were thoroughly mixed and wet pulverized until formation of a slurry. The same honeycomb carrier of cordierite as used in Example 1 was immersed in the slurry obtained as described above. The wet honeycomb carrier was made to drain off excess slurry and then dried at 150° C. for 1 hour, to obtain a catalyst.

The amounts of iron oxide, manganese oxide, platinum, titania-zirconia, and silica-alumina deposited on the catalyst were found to be 10 g, 20 g, 2 g, 100 g, and 70 g respectively per liter of the structure.

EXAMPLE 5

An alumina powder was obtained by placing 1 kg of an alumina powder (average particle diameter 1.2 μm) having a specific surface area of 90 m$^2$/g, 50 g of iron oxide, and 100 g of manganese oxide in deionized water, thoroughly stirring them in the deionized water, drying the prepared wet mixture at 180° C. for 1 hour, and further calcining the dried mixture at 500° C. for 2 hours. Separately, in an aqueous solution prepared by dissolving a rhodium nitrate solution containing 5 g of rhodium and 19 g of copper nitrate in deionized water, 1 kg of a zirconia powder (average particle diameter 1.2 μm) having a specific surface area of 100 m$^2$/g was placed and thoroughly stirred. The prepared wet mixture was dried at 150° C. for 2 hours and further calcined at 650° C. for 1 hour to obtain a zirconia powder having rhodium and copper oxide deposited as dispersed thereon. The alumina powder and the zirconia powder were wet pulverized until formation of a slurry.

The same honeycomb carrier of cordierite as used in Example 1 was immersed in the slurry obtained as described above, made to drain off excess slurry, and then dried at 150° C. for 1 hour to obtain a catalyst.

The amounts of iron oxide, manganese oxide, rhodium, copper oxide, alumina, and zirconia deposited on this catalyst were found to be 5 g, 10 g, 0.5 g, 0.5 g, 100 g, and 100 g respectively per liter of the structure.

EXAMPLE 6

In an aqueous solution prepared by dissolving 747 g of iron chloride and 456 g of manganese chloride in deionized water, 1 kg of an alumina-zirconia powder (average particle diameter 1.0 μm, $Al_2O_3/ZrO_2$ mol ratio 1/1) was placed and thoroughly stirred. The prepared wet mixture was dried at 180° C. for 2 hours and calcined at 600° C. for 1 hour to obtain an alumina-zirconia powder having iron oxide and manganese oxide deposited as dispersed thereon. Separately, an alumina powder was obtained by following the procedure described above while causing impregnation of 1 kg of an alumina powder (average particle diameter 1.0 μm) having a specific surface area of 80m$^2$/g in a solution of chloroplatinic acid containing 20 g of platinum and 3.4 g of copper chloride in deionized water instead. The alumina-zirconia powder and the alumina powder were thoroughly mixed and wet pulverized until formation of a slurry.

A cylindrical honeycomb carrier of stainless steel measuring 5.66 inches in diameter and 6.00 inches in length and containing about 200 open flow gas cells having a cross-sectional area of 1 square inch was immersed in the slurry obtained as described above. The wet honeycomb carrier was made to drain off excess slurry, then dried at 150° C. for 1 hour, and subsequently calcined at 400° C. for 1 hour, to obtain a complete catalyst.

The amounts of iron oxide, manganese oxide, platinum, copper oxide, alumina-zirconia, and alumina deposited on the catalyst were found to be 30 g, 10 g, 1 g, 0.1 g, 50 g, and 50 g respectively per liter of the structure.

EXAMPLE 7

In an aqueous solution prepared by dissolving 506 g of iron nitrate, 203 g of manganese acetate, and 50 g of cerium nitrate in deionized water, 1 kg of an alumina powder (average particle diameter 1.0 μm) having a specific surface area of 100 m$^2$/g was placed and thoroughly stirred. The prepared wet mixture was dried at 200° C. for 2 hours and further calcined at 500° C. for 1 hour to obtain an alumina powder having iron oxide, manganese oxide, and cerium oxide deposited as dispersed thereon. Separately, a zirconia powder was obtained by following the procedure described above while causing impregnation of 600 g of a zirconia powder (average particle diameter 1.0 μm) having a specific surface area of 80 m²/g in an aqueous solution prepared by dissolving palladium nitrate containing 40 g of palladium and 77 g of copper nitrate in deionized water. The alumina powder and the zirconia powder were mixed and wet pulverized until formation of a slurry.

A cylindrical honeycomb carrier of cordierite measuring 5.66 inches in diameter and 6.00 inches in length and containing about 400 open flow gas cells having a cross-sectional area of 1 square inch was immersed in the slurry obtained as described above. The wet honeycomb carrier was made to drain off excess slurry, then dried at 150° C. for 2 hours, and subsequently calcined at 500° C. for 1 hour, to obtain a catalyst.

The amounts of iron oxide, manganese oxide, cerium oxide, palladium, copper oxide, alumina, and zirconia deposited on this catalyst were found to be 5 g, 3.6 g, 1 g, 2 g, 1 g, 50 g, and 30 g respectively per liter of the structure.

EXAMPLE 8

A titania powder was obtained by placing 800 g of a titania powder (average particle diameter 1.0 μm) having a specific surface area of 125 m²/g, 50 g of iron oxide, 36 g of manganese oxide, and 50 g of lanthanum oxide in deionized water, thoroughly mixing them, drying the resultant wet mixture at 150° C. for 2 hours, and further calcining the dried mixture at 600° C. for 1 hour. A silica powder was obtained by following the procedure described above while causing impregnation of 700 g of a silica powder (average particle diameter 0.8 μm) having a specific surface diameter of 150 m²/g in an aqueous solution prepared by dissolving palladium nitrate containing 20 g of palladium and 39 g of copper nitrate in deionized water. The titania powder and the silica powder were mixed and wet pulverized until formation of a slurry.

A cylindrical honeycomb carrier of cordierite measuring 5.66 inches in diameter and 6.00 inches in length and containing about 300 open flow gas cells having a cross-sectional area of 1 square inch was immersed in the slurry obtained as described above. The wet honeycomb carrier was made to drain off excess slurry, then dried at 150° C. for 2 hours, and subsequently calcined at 500° C. for 1 hour, to obtain a catalyst.

The amounts of iron oxide, manganese oxide, lanthanum oxide, palladium, copper oxide, titania, and silica deposited on this catalyst were found to be 5 g, 3.6 g, 5 g, 2 g, 1 g, 80 g and 70 g respectively per liter of the structure.

EXAMPLE 9

In an aqueous solution prepared by dissolving 1012 g of iron nitrate, 406 g of manganese acetate, and 254 g of magnesium nitrate in deionized water, 1 kg of a zirconia powder (average particle diameter 1.0 μm) having a specific surface area of 80 m²/g was placed and thoroughly stirred. The prepared wet mixture was dried at 180° C. for 2 hours and further calcined at 500° C. for 1 hour to obtain a zirconia powder having iron oxide, manganese oxide, and magnesium oxide deposited as dispersed thereon. Separately, a zirconia powder was obtained by following the procedure described above while causing impregnation of 1 kg of a zirconia powder (average particle diameter 1.0 μm) having a specific surface area of 80 m²/g in an aqueous solution prepared by dissolving palladium nitrate containing 80 g of palladium and 113 g of copper nitrate in deionized water.

These two zirconia powders were mixed and wet pulverized until formation of a slurry.

A cylindrical honeycomb carrier of stainless steel measuring 5.66 inches in diameter and 6.00 inches in length and containing about 200 open flow gas cells having a cross-sectional area of 1 square inch was immersed in the slurry obtained as described above. The wet honeycomb carrier was made to drain off excess slurry, then dried at 150° C. for 2 hours, and subsequently calcined at 500° C. for 1 hour, to obtain a catalyst.

The amounts of iron oxide, manganese oxide, magnesium oxide, palladium, and copper oxide deposited on this catalyst were found to be 5 g, 3.6 g, 1 g, 2 g, and 1 g respectively per liter of the structure and the amount of zirconia was found to be 25 g respectively per litter of the structure.

EXAMPLE 10

A zirconia powder was obtained by placing 1 kg of a zirconia powder (average particle diameter 1.0 μm) having a specific surface area of 110 m²/g in an aqueous solution of 50 g of iron oxide, 36 g of manganese oxide, and 211 g of calcium nitrate in deionized water, thoroughly stirring them, drying the prepared wet mixture at 200° C. for 2 hours, and further calcining the dried mixture at 600° C. for 1 hour. Separately, a titania powder was obtained by following the procedure described above while causing impregnation of 500 g of a titania powder (average particle diameter 0.8 μm) having a specific surface area of 150 m²/g in an aqueous solution prepared by dissolving palladium nitrate containing 20 g of palladium and 39 g of copper nitrate in deionized water. The zirconia powder and the titania powder were mixed and wet pulverized until formation of a slurry.

A cylindrical honeycomb carrier of cordierite measuring 5.66 inches in diameter and 6.00 inches in length and containing about 300 open flow gas cells having a cross-sectional area of 1 square inch was immersed in the slurry obtained as described above. The wet honeycomb carrier was made to drain off excess slurry, then dried at 150° C. for 2 hours, and subsequently calcined at 500° C. for 1 hour, to obtain a catalyst.

The amounts of iron oxide, manganese oxide, calcium oxide, palladium, copper oxide, zirconia, and titania deposited on this catalyst were found to be 5 g, 3.6 g, 5 g, 2 g, 1 g, 100 g, and 50 g respectively per liter of the structure.

EXAMPLE 11

An alumina powder having iron oxide, manganese oxide, magnesium oxide, and cerium oxide deposited as dispersed thereon was obtained by placing 1 kg of an alumina powder (average particle diameter 1.0 μm) having a specific surface area of 100 m²/g, 1012 g of iron nitrate, 406 g of manganese acetate, 254 g of magnesium nitrate, and 101 g of cerium nitrate in deionized water, thoroughly stirring them, then drying the prepared wet mixture at 150° C. for 2 hours, and further calcining the dried mixture at 500° C. for 1 hour. Separately, a zirconia powder was obtained by following the procedure described above while causing impregnation of 1 kg of a zirconia powder (average particle diameter 1.0 μm) having a specific surface area of 80 m²/g in an aqueous solution prepared by dissolving palladium nitrate containing 80 g of palladium and 155 g of copper nitrate in deionized water.

A cylindrical honeycomb carrier of stainless steel measuring 5.66 inches in diameter and 6.00 inches in length and containing about 400 open flow gas cells having a cross-sectional area of 1 square inch was immersed in the slurry obtained as described above. The wet honeycomb carrier was made to drain off excess slurry, then dried at 150° C. for 2 hours, and subsequently calcined at 500° C. for 1 hour, to obtain a catalyst.

The amounts of iron oxide, manganese oxide, magnesium oxide, cerium oxide, palladium, copper oxide, alumina, and zirconia deposited on this catalyst were found to be 5 g, 3.6 g, 1 g, 1 g, 2 g, 1 g, 25 g, and 25 g respectively per liter of the structure.

Control 1

In an aqueous solution prepared by dissolving palladium nitrate containing 30 g of palladium, 31.3 g of copper sulfate, 253 g of iron nitrate, and 195 g of manganese nitrate in deionized water, 1 kg of a titania powder (average particle diameter 1.2 μm) having a specific surface area of 100 $m^2/g$ was placed and thoroughly stirred. The prepared wet mixture was dried at 150° C. for 2 hours and further calcined at 550° C. for two hours to obtain a titania powder having palladium, copper oxide, iron oxide, and manganese oxide deposited as dispersed thereon. The titania powder was thoroughly wet pulverized until formation of a slurry.

A cylindrical honeycomb carrier of cordierite measuring 5.66 inches in diameter and 6.00 inches in length and containing about 300 open flow gas cells having a cross-sectional area of 1 square inch was immersed in the slurry obtained as described above. The wet honeycomb carrier was made to drain off excess slurry, then dried at 150° C. for 1 hour, and subsequently calcined at 500° C. for 1 hour, to obtain a catalyst.

The amounts of palladium, copper oxide, iron oxide, manganese oxide, and titania deposited on this catalyst were found to be 3 g, 1 g, 5 g, 3.6 g and 100 g respectively per liter of the structure.

Control 2

In an aqueous solution prepared by dissolving palladium nitrate containing 1 g of palladium and 3.2 g of copper sulfate in deionized water, 1 kg of a zirconia powder (average particle diameter 2.0 μm) having a specific surface area of 45 $m^2/g$ was placed and thoroughly stirred. The prepared wet mixture was dried at 180° C. for 1 hour and calcined at 700° C. for 1 hour to obtain a zirconia powder having palladium and copper oxide deposited as dispersed thereon. This zirconia powder was thoroughly wet pulverized until formation of a slurry.

A cylindrical honeycomb carrier of cordierite measuring 5.66 inches in diameter and 6.00 inches in length and containing about 200 open flow gas cells having a cross-sectional area of 1 square inch was immersed in the slurry obtained as described above. The wet honeycomb carrier was made to drain off excess slurry, then dried at 150° C. for 2 hours, and subsequently calcined at 500° C. for 1 hour, to obtain a catalyst.

Separately, in an aqueous solution prepared by dissolving 249 g of iron chloride and 228 g of manganese chloride in deionized water, 1 kg of an alumina powder (average particle diameter 1.0 μm) having a specific surface area of 95 $m^2/g$ was placed and thoroughly stirred. The prepared wet mixture was dried at 170° C. for 1 hour and calcined at 650° C. for 2 hours to obtain an alumina powder having iron oxide and manganese oxide deposited as dispersed thereon. This alumina powder was thoroughly wet pulverized until formation of a slurry.

The same honeycomb carrier as mentioned above was immersed in the slurry obtained as described above and the prepared wet honeycomb carrier was treated to induce deposition of the alumina powder on the zirconia powder and produce a catalyst in the same manner as described above.

The amounts of palladium, copper oxide, iron oxide, manganese oxide, zirconia, and alumina deposited on this catalyst were found to be 0.1 g, 0.1 g, 20 g, 10 g, 100 g, and 100 g respectively per liter of the structure.

Control 3

In an aqueous solution prepared by dissolving 253 g of iron nitrate and 271 g of manganese nitrate in deionized water, 1.5 kg of an alumina powder (average particle diameter 2.0 μm) having a specific surface area of 60 $m^2/g$ was placed and thoroughly stirred. The prepared wet mixture was dried at 160° C. for 1 hour and calcined at 500° C. for 2 hours to obtain an alumina powder having iron oxide and manganese oxide deposited as dispersed thereon. This alumina powder was wet pulverized until formation of a slurry.

A cylindrical honeycomb carrier of cordierite measuring 5.66 inches in diameter and 6.00 inches in length and containing about 100 open flow gas cells having a cross-sectional area of 1 square inch was immersed in the slurry obtained as described above. The wet honeycomb carrier was made to drain off excess slurry and then dried at 150° C. for 2 hours to obtain a catalyst.

Separately, in an aqueous solution prepared by dissolving palladium nitrate containing 10 g of palladium and 7.7 g of copper nitrate in deionized water, 500 g of a titania powder (average particle diameter 1.0 μm) having a specific surface area of 150 $m^2/g$ was placed and thoroughly stirred. The prepared wet mixture was dried at 150° C. for 1 hour and calcined at 600° C. for 1 hour to obtain a titania powder having palladium and copper oxide deposited as dispersed thereon. This titania powder was thoroughly wet pulverized until formation of a slurry.

The same honeycomb carrier as mentioned above was immersed in the slurry obtained as described above and the resultant wet honeycomb carrier was treated to induce deposition of the titania powder on the alumina powder and produce a catalyst in the same manner as described above.

The amounts of iron oxide, manganese oxide, palladium, copper oxide, alumina, and titania deposited on this catalyst were found to be 5 g, 5 g, 1 g, 0.2 g, 150 g, and 50 g respectively per liter of the structure.

Control 4

A catalyst was obtained by faithfully following the procedure of Control 1 while using an aqueous solution of 228 g of copper nitrate in deionized water instead. The amounts of alumina and copper oxide deposited on this catalyst were found to be 50 g and 3.0 g respectively per liter of the structure.

Control 5

A catalyst was obtained by faithfully following the procedure of Control 1 while using an aqueous solution of 158 g of chromium nitrate in deionized water instead. The amounts of alumina and chromium oxide deposited on this catalyst were found to be 50 g and 3.0 g respectively per liter of the structure.

Control 6

A catalyst was obtained by faithfully following the procedure of Control 1 while using an aqueous solution of palladium nitrate containing 20 g of palladium in deionized water instead. The amounts of alumina and palladium deposited on this catalyst were found to be 50 g and 0.1 g respectively per liter of the structure.

Control 7

A catalyst was obtained by faithfully following the procedure of Control 1 while using an aqueous solution of chloroplatinic acid containing 20 g of platinum in deionized water instead. The amounts of alumina and platinum deposited on this catalyst were found to be 50 g and 1.0 g respectively per liter of the structure.

Control 8

A catalyst was obtained by faithfully following the procedure of Control 1 while using an aqueous solution of rhodium nitrate containing 20 g of rhodium in deionized water instead. The amounts of alumina and rhodium deposited on this catalyst were found to be 50 g and 1.0 g respectively per liter of the structure.

Control 9

A catalyst was obtained by faithfully following the procedure of Control 1 while using an aqueous solution of 200 g of nickel acetate and 12.1 g of copper acetate in deionized water instead. The amounts of alumina, nickel oxide, and copper oxide deposited on this catalyst were found to be 50 g, 3.0 g, and 1.5 g respectively per liter of the structure.

Control 10

A catalyst was obtained by faithfully following the procedure of Control 1 while using an aqueous solution of 72.5 g of cobalt nitrate and 60.7 g of copper nitrate in deionized water instead. The amounts of alumina, cobalt oxide, and copper oxide deposited on this catalyst were found to be 50 g, 1.0 g, and 1.0 g respectively per liter of the structure.

The amounts of the components deposited on the catalysts obtained in Examples 1 to 11 and Controls 1 to 10 mentioned above are shown in Table 1 and Table 2.

TABLE 1

| | Active component of catalyst (g/liter of carrier) | | Refractory inorganic ioxide (g/liter of carrier) | | Three-dimensional structure Type | Number of cells per square inch |
|---|---|---|---|---|---|---|
| Example 1 | $Fe_2O_3/MnO_2$ (molar ratio 3/2) | 5/3.6 | $ZrO_2$ | 25 | Ceramic honycomb | 400 |
| | Pd/CuO | 3/1 | $ZrO_2$ | 25 | | |
| Example 2 | $Fe_2O_3/MnO_2$ | 3/1 | $Al_2O_3$ | 30 | Ceramic honycomb | 400 |
| | Pd | 6 | $ZrO_2$ | 20 | | |
| Example 3 | $Fe_2O_3/MnO_2$ | 2/3 | $SiO_2$ | 50 | Metal honycomb | 300 |
| | Rh | 1 | $TiO_2$ | 50 | | |
| Example 4 | $Fe_2O_3/MnO_2$ | 10/20 | $TiO_2/ZrO_2$ (molar ratio 3/1) | 100 | Ceramic honycomb | 400 |
| | Pt | 2 | $SiO_2/Al_2O_3$ (molar ratio 2/1) | 70 | | |
| Example 5 | $Fe_2O_3/MnO_2$ | 5/10 | $Al_2O_3$ | 100 | Ceramic honycomb | 400 |
| | Rh/CuO | 0.5/0.5 | $ZrO_2$ | 100 | | |
| Example 6 | $Fe_2O_3/MnO_2$ | 30/10 | $Al_2O_3/ZrO_2$ (molar ratio 1/1) | 50 | Metal honycomb | 200 |
| | Pt/CuO | 1/0.1 | $Al_2O_3$ | 50 | | |
| Example 7 | $Fe_2O_3/MnO_2/CeO_2$ | 5/3.6/1 | $Al_2O_3$ | 50 | Ceramic honycomb | 400 |
| | Pd/CuO | 2/1 | $ZrO_2$ | 30 | | |
| Example 8 | $Fe_2O_3/MnO_2/LaO_2$ | 5/3.6/5 | $TiO_2$ | 80 | Ceramic honycomb | |
| | Pd/CuO | 2/1 | $SiO_2$ | 70 | | 300 |
| Example 9 | $Fe_2O_3/MnO_2/MgO$ | 5/3.6/1 | $ZrO_2$ | 25 | Metal honycomb | |
| | Pd/CuO | 2/1 | $ZrO_2$ | 25 | | 200 |
| Example 10 | $Fe_2O_3/MnO_2/CaO$ | 5/3.6/5 | $ZrO_2$ | 100 | Ceramic honycomb | 300 |
| | Pd/CuO | 2/1 | $TiO_2$ | 50 | | |
| Example 11 | $Fe_2O_3/MnO_2/MgO/CeO_2$ | 5/3.6/1/1 | $Al_2O_3$ | 25 | Metal honycomb | 400 |
| | Pd/CuO | 2/1 | $ZrO_2$ | 25 | | |

TABLE 2

| | Active component of catalyst (g/liter of carrier) | | Refractory inorganic oxide (g/liter of carrier) | | Three-dimensional structure Type | Number of cells per square inch |
|---|---|---|---|---|---|---|
| Control 1 | $Pd/Cu/Fe_2O_3/Mn\,O_2$ | 3/1/5/3.6 | $TiO_2$ | 100 | Ceramic honycomb | 300 |
| Control 2 | (1st stage) Pd/CuO | 0.1/0.1 | $ZrO_2$ | 100 | Ceramic honycomb | 200 |
| | (2nd stage) $Fe_2O_3/Mn\,O_2$ | 20/10 | $Al_2O_3$ | 100 | | |
| Control 3 | $Fe_2O_3/MnO_2$ | 5/5 | $Al_2O_3$ | 150 | Metal honycomb | 100 |
| | Pd/CuO | 1/0.2 | $TiO_2$ | 50 | | |
| Control 4 | CuO | 3.0 | $Al_2O_3$ | 50 | Ceramic honycomb | 400 |

TABLE 2-continued

|  | Active component of catalyst (g/liter of carrier) |  | Refractory inorganic oxide (g/liter of carrier) |  | Three-dimensional structure | |
|---|---|---|---|---|---|---|
|  |  |  |  |  | Type | Number of cells per square inch |
| Control 5 | $Cr_2O_3$ | 3.0 | $Al_2O_3$ | 50 | Ceramic honycomb | 400 |
| Control 6 | Pd | 1.0 | $Al_2O_3$ | 50 | Ceramic honycomb | 400 |
| Control 7 | Pt | 1.0 | $Al_2O_3$ | 50 | Ceramic honycomb | 400 |
| Control 8 | Rh | 1.0 | $Al_2O_3$ | 50 | Ceramic honycomb | 400 |
| Control 9 | NiO/CuO | 3/1.5 | $Al_2O_3$ | 50 | Ceramic honycomb | 400 |
| Control 10 | $Co_3O_4$/CuO | 1/1 | $Al_2O_3$ | 50 | Ceramic honycomb | 400 |

Evaluation of Catalyst

The catalysts were tested for ability to purify diesel engine exhaust gas by the following method.

In this test, a supercharging direct injection type diesel engine (4 cylinders, 2800 cc) and gas oil having a sulfur content of 0.38% by weight as a fuel were used.

The exhaust gas before entering the catalyst bed and the exhaust gas after departing from the catalyst bed were also analyzed for sulfur dioxide and gaseous hydrocarbons to determine the ratio of conversion (%). The results are shown in Table 3.

TABLE 3

|  | Ratio of removal of microfine substances (%) | | Ratio of removal of SOF (%) | | Ratio of removal of hydrocarbons (%) | | Conversion of sulfur oxides (%) | |
|---|---|---|---|---|---|---|---|---|
|  | 300° C. | 500° C. | 300° C. | 500° C. | 300° C. | 500° C. | 300° C. | 500° C. |
| Example 1 | 30 | 17 | 60 | 87 | 59 | 92 | 0 | 5 |
| Example 2 | 21 | 14 | 50 | 80 | 57 | 90 | 0 | 6 |
| Example 3 | 25 | 16 | 51 | 78 | 51 | 85 | 0 | 5 |
| Example 4 | 21 | 13 | 60 | 82 | 52 | 85 | 0 | 6 |
| Example 5 | 24 | 15 | 52 | 79 | 48 | 82 | 0 | 4 |
| Example 6 | 27 | 16 | 50 | 78 | 60 | 83 | 0 | 5 |
| Example 7 | 22 | 11 | 50 | 81 | 53 | 88 | 0 | 6 |
| Example 8 | 24 | 13 | 52 | 84 | 54 | 86 | 0 | 4 |
| Example 9 | 29 | 17 | 59 | 85 | 55 | 90 | 0 | 4 |
| Example 10 | 25 | 13 | 56 | 83 | 57 | 85 | 0 | 5 |
| Example 11 | 28 | 15 | 55 | 82 | 56 | 91 | 0 | 5 |
| Control 1 | 14 | −31 | 39 | 71 | 40 | 72 | 0 | 15 |
| Control 2 | 11 | −20 | 41 | 73 | 45 | 75 | 0 | 25 |
| Control 3 | 13 | −35 | 38 | 69 | 38 | 70 | 0 | 32 |
| Control 4 | 6 | −126 | 21 | 56 | 26 | 66 | 0 | 17 |
| Control 5 | 13 | −285 | 32 | 69 | 38 | 85 | 0 | 35 |
| Control 6 | −86 | −505 | 76 | 88 | 75 | 93 | 21 | 62 |
| Control 7 | −220 | −676 | 82 | 86 | 91 | 92 | 48 | 76 |
| Control 8 | 21 | −342 | 39 | 87 | 42 | 92 | 0 | 42 |
| Control 9 | 16 | −112 | 42 | 81 | 56 | 78 | 0 | 16 |
| Control 10 | 19 | −162 | 48 | 79 | 59 | 81 | 0 | 21 |

A sample catalyst was set in an exhaust gas tube from the engine mentioned above and subjected to a 300 hour's durability test under the conditions of 2500 rpm of full load of engine speed and 600° C. of catalyst inlet temperature.

Then, under the stable conditions of 2000 rpm of engine speed and 300° C. and 500° C. of catalyst inlet temperature, the exhaust gas was sampled before the entry into the catalyst bed (inlet) and after the departure from the catalyst bed (outlet) and analyzed for the content of microfine substances by the standard dilution tunnel method to determine the ratio of removal of the microfine substances (%).

Further, the microfine substances seized by the sample catalyst with a dilution tunnel were extracted in a dichloromethane solution. And the amount of SOF discharged from the engine and the ratio of removal of SOF was determined by the change of weight of the microfine substances before and after the extraction.

What is claimed is:

1. A catalyst for purification of diesel engine exhaust gas, which comprises having a component of group A comprising the two elements of iron and manganese and a refractory inorganic oxide and a catalytic component of group B comprising at least one noble metal selected from the group consisting of palladium, platinum, and rhodium and a refractory inorganic oxide deposited in the form of a single layer on a refractory three-dimensional structure, wherein said refractory inorganic oxide has an average particle diameter in the range of from 0.1 to 5 μm and a BET surface area in the range of from 1 to 200 $m^2$/g.

2. A catalyst according to claim 1, wherein a total amount of said two elements of iron and manganese deposited is in the range of from 0.5 to 50 g and an amount of said noble metal in the range of from 0.001 to 6 g per liter of said three-dimensional structure and a molar ratio of iron to manganese is in the range of from 10:1 to 1:10.

3. A catalyst according to claim 2, wherein a total amount of said refractory inorganic oxide is in the range of from 1 to 300 g per liter of said three-dimensional structure.

4. A catalyst according to claim 3, wherein a total amount of said two elements of iron and manganese is in the range of from 0.1 to 98% by weight and an amount of said noble metal in the range of from 0.0003 to 80% by weight, based on the amount of said refractory inorganic oxide.

5. A catalyst according to claim 1, wherein said three-dimensional structure is an open flow type ceramic honeycomb or metal honeycomb carrier.

6. A catalyst for purification of diesel engine exhaust gas, which comprises having a component of group C comprising the two elements of iron and manganese and a refractory inorganic oxide and an alkaline earth element and or a rare earth element and a catalytic component of group B comprising at least one noble metal selected from the group consisting of palladium, platinum, and rhodium and a refractory inorganic oxide deposited in the form of a single layer on a refractory three-dimensional structure, wherein said refractory inorganic oxide has an average particle diameter in the range of from 0.1 to 5 µm and a BET surface area in the range of from 1 to 200 m$^2$/g.

7. A catalyst according to claim 6, wherein a total amount of said two elements of iron and manganese deposited is in the range of from 0.5 to 50 g, an amount of said alkaline earth element in the range of from 0 to 20 g, and the amount of said rare earth element in the range of from 0 to 30 g per liter of said three-dimensional structure, wherein a total amount of the alkaline earth element and the rare earth element is beyond 0 g and a molar ratio of iron to manganese is in the range of from 10:1 to 1:10.

8. A catalyst according to claim 7, wherein the total amount of said refractory inorganic oxide is in the range of from 1 to 300 g per liter of said three-dimensional structure.

9. A catalyst according to claim 8, wherein said refractory inorganic oxide has an average particle diameter in the range of from 0.1 to 5 µm and a BET surface area in the range of from 1 to 200 m$^2$/g.

10. A catalyst according to claim 8, wherein a total amount of iron and manganese is in the range of from 0.1 to 98% by weight and an amount of said noble metal in the range of from 0.0003 to 80% by weight, based on the amount of said refractory inorganic oxide.

11. A catalyst according to claim 6, wherein said three-dimensional structure is an open flow type ceramic honeycomb or metal honeycomb carrier.

12. A catalyst according to claim 7, wherein an amount of said alkaline earth element carried is in the range of from 0.1 to 10 g and an amount of said rare earth element in the range of from 0.1 to 10 g per liter of said three-dimensional structure.

13. A catalyst for purification of diesel engine exhaust gas, which comprises having a component of group A comprising the two elements of iron and manganese and a refractory inorganic oxide and a catalytic component of group D comprising at least one noble metal selected from the group consisting of palladium, platinum, and rhodium and copper and a refractory inorganic oxide deposited in the form of a single layer on a refractory three-dimensional structure, wherein said refractory inorganic oxide has an average particle diameter in the range of from 0.1 to 5 µm and a BET surface area in the range of from 1 to 200 m$^2$/g.

14. A catalyst according to claim 13, wherein a total amount of said two elements of iron and manganese deposited is in the range of from 0.5 to 50 g, an amount of said noble metal in the range of from 0.001 to 6 g, and an amount of copper in the range of from 0.01 to 10 g per liter of said three-dimensional structure and the molar ratio of iron to manganese is in the range of from 10:1 to 1:10.

15. A catalyst according to claim 14, wherein an amount of said refractory inorganic oxide is in the range of from 1 to 300 g per liter of said three-dimensional structure.

16. A catalyst according to claim 15, wherein a total amount of iron and manganese is in the range of from 0.1 to 98% by weight and an amount of said noble metal in the range of from 0.0003 to 80% by weight, based on the amount of said refractory inorganic oxide.

17. A catalyst according to claim 13, wherein said three-dimensional structure is an open flow type ceramic honeycomb or metal honeycomb carrier.

18. A catalyst according to claim 13, wherein an amount of copper carried is in the range of from 0.1 to 3 g per liter of said three-dimensional structure.

19. A catalyst for purification of diesel engine exhaust gas, which comprises having a component of group C comprising the two elements of iron and manganese and a refractory inorganic oxide and an alkaline earth element and or a rare earth element and a catalytic component of group D comprising at least one noble metal selected from the group consisting of palladium, platinum, and rhodium and copper and a refractory inorganic oxide deposited in the form of a single layer on a refractory three-dimensional structure, wherein said refractory inorganic oxide has an average particle diameter in the range of from 0.1 to 5 µm and a BET surface area in the range of from 1 to 200 m$^2$/g.

20. A catalyst according to claim 19, wherein a total amount of said two elements of iron and manganese deposited is in the range of from 0.5 to 50 g, the amount of said alkaline earth element in the range of from 0 to 20 g, the amount of said rare earth element in the range of from 0 to 30 g, wherein a total amount of the alkaline earth element and the rare earth element is beyond 0 g, and an amount of the noble metal is in the range of 0.001 to 6 g and an amount of copper is in the range of 0.01 to 10 g per liter of said three-dimensional structure and the molar ratio of iron to manganese is in the range of from 10:1 to 1:10.

21. A catalyst according to claim 20, wherein a total amount of said refractory inorganic oxide is in the range of from 1 to 300 g per liter of said the three-dimensional structure.

22. A catalyst according to claim 21, wherein a total amount of iron and manganese is in the range of from 0.1 to 98% by weight and the amount of said noble metal in the range of from 0.0003 to 80% by weight, based on the amount of said refractory inorganic oxide.

23. A catalyst according to claim 19, wherein said three-dimensional structure is an open flow type ceramic honeycomb or metal honeycomb carrier.

24. A catalyst according to claim 19, wherein an amount of said alkaline earth element carried is in the range of from 0.1 to 10 g and an amount of said rare earth element in the range of from 0.1 to 10 g per liter of said three-dimensional structure.

25. A catalyst according to claim 19, wherein an amount of copper carried is in the range of 0.1 to 3 g per liter of said three-dimensional structure.

* * * * *